United States Patent [19]
Nolan

[11] Patent Number: 5,173,000
[45] Date of Patent: Dec. 22, 1992

[54] FLEXIBLE COUPLING

[76] Inventor: Terence P. Nolan, Lagore Road, Dunshaughlin, County Meath, Ireland

[21] Appl. No.: 405,830

[22] Filed: Sep. 6, 1989

[30] Foreign Application Priority Data

Sep. 7, 1988 [IE] Ireland .................................. 2696/88
May 30, 1989 [IE] Ireland .................................. 1686/89

[51] Int. Cl.$^5$ ............................................. F16D 1/00
[52] U.S. Cl. .................................... 403/224; 403/220; 403/228
[58] Field of Search ............... 403/224, 227, 223, 225, 403/228, 221, 220

[56] References Cited

U.S. PATENT DOCUMENTS

| | | | |
|---|---|---|---|
| 317,157 | 5/1885 | Lowrie | 403/220 |
| 1,732,646 | 10/1929 | Flintermann | 403/220 X |
| 1,735,982 | 11/1929 | Short | 403/220 X |
| 2,080,627 | 5/1937 | Morgan | 403/220 X |
| 2,154,586 | 4/1939 | Stern | 403/220 X |
| 2,819,105 | 1/1958 | Behnke | 403/224 |
| 2,969,656 | 1/1961 | Reuter | 403/223 X |
| 3,799,100 | 3/1974 | Marriner | 114/235 |
| 4,080,921 | 3/1978 | Frietag | 114/249 |
| 4,195,887 | 4/1980 | Ruddell | 403/225 X |
| 4,235,482 | 11/1980 | Gibson | 308/26 |
| 4,741,521 | 5/1988 | Schiffner et al. | 267/140.1 |

FOREIGN PATENT DOCUMENTS

| | | |
|---|---|---|
| 0160241 | 9/1985 | Norway . |
| 0861934 | 11/1987 | Norway . |
| 593466 | 10/1947 | United Kingdom ................ 403/228 |
| 1223471 | 2/1971 | United Kingdom . |
| 1409563 | 10/1975 | United Kingdom . |
| 2027162 | 2/1980 | United Kingdom . |
| 2063373A | 6/1981 | United Kingdom . |
| 2094393A | 9/1982 | United Kingdom . |
| 2110295A | 6/1983 | United Kingdom . |
| 2111588A | 7/1983 | United Kingdom . |
| 2195072 | 3/1988 | United Kingdom . |
| WO8703170 | 6/1987 | World Int. Prop. O. . |

*Primary Examiner*—Andrew V. Kundrat
*Attorney, Agent, or Firm*—Kenyon & Kenyon

[57] ABSTRACT

A coupling 1, 50, 100 for joining adjacent frame members 2, 3 of a fish breeding enclosure 5 comprises a first mounting means 10, 52, 105, 106 for mounting to one frame member 2, a second mounting means 11, 53, 105, 106 for mounting to another frame member 3 and a flexible body 12, 51, 101 of elastomeric material between the first and second mounting means 10, 11, 52, 53, 105, 106. The coupling 1, 50, 100 constrains relative rotational and translational movement between the frame members 2, 3 in use to a predetermined level which is determined by the material of the flexible body 12, 51, 101 and/or by mechanical limit stops 62, 63. A non flexible connection such as a rod 35 having flanges 36, 37 or a chain 90, 110 provides a mechanical connection between the mounting means 10, 11, 52, 53, 105, 106 in the event of failure of the flexible body 12, 51, 101.

11 Claims, 10 Drawing Sheets

FLEXIBLE COUPLING

FIELD OF THE INVENTION

The invention relates to a coupling for joining frame members of a fish breeding enclosure framework.

Fish breeding enclosures comprising a framework formed by interconnecting frame members are known. In one known arrangement the frame members are pivotally interconnected by a pivot pin arrangement for pivotal movement about a pivot axis transverse to the longitudinal axis of the frame member to which it is attached. However, the forces which such enclosures can accommodate are relatively small so that such enclosures have limited application both in terms of their size and in the waterways in which they may be sited.

SUMMARY OF THE INVENTION

According to the invention there is provided a coupling for joining frame members of a fish breeding enclosure framework, the coupling comprising:
 a first mounting means for mounting to a frame member,
 a second mounting means for mounting to another frame member, and
 a connecting body of flexible material between the first and second mounting means, the body deforming in use in a controlled manner to permit relative rotational and translational movement between the frame members in a predetermined manner.

In one embodiment of the invention the coupling includes connection means between the mounting means or frame members to provide a mechanical connection between the frame members in the event of failure of the flexible body. Advantageously the connection means comprises a non-flexible member extending between the mounting means.

In a particularly preferred embodiment of the invention bonding means are provided for bonding the flexible body to the mounting means.

In one particularly important aspect of the invention the flexible body has a longitudinal axis which extends generally transversely of the longitudinal axis of the frame members.

In this case the flexible body is preferably confined within an outer casing forming the mounting means or to which the mounting means is attached.

Preferably the flexible body comprises at least two flexible body parts and connection means are provided between the body parts to constrain ratational movement between the flexible body parts. Advantageously the flexible body parts have central co-axially arranged bores to receive a complementary shaped rod.

Typically, each flexible body part is confined within an associated outer casing part.

Preferably each flexible body is confined in a housing comprising an inner housing part and an outer housing part which are spaced-apart to confine the flexible body therebetween, the inner housing part defining the bore for reception of the rod and the outer housing part being a force fit in the associated outer casing.

In this case preferably the inner housing part and the flexible body extends axially beyond at least one end of the outer housing part to permit relative translational movement between the flexible body parts in shear and compression along the axis of the flexible body parts, the ends of the outer housing parts providing limit stops to limit the movement of the flexible body parts.

Preferably the inner bores defined by the inner housing parts are polygonal in transverse cross section and the connecting rod is of complementary polygonal shape for distributing loads applied to the frame members between the flexible body parts.

Typically the longitudinal axis of the flexible body part is inclined with respect to the longitudinal axis of the bore.

In this case preferably the longitudinal axes of adjacent flexible body parts are inclined with respect to each other.

In a particularly preferred embodiment of the invention the outer casing comprises a central casing part associated with one frame member and a pair of side casing parts flanking the central casing part and being associated with another frame member.

In one case the central casing part is approximately twice the width of each side casing part, there being four identical housing parts, one within each side casing part and two within the central casing part.

Preferably each outer housing part includes a radially outwardly extending flange for locating and limiting the entry of the outer housing into an associated casing.

In another particularly preferred aspect of the invention the outer casing comprises two longitudinally extending casing parts attached to the flexible body and carrying the mounting means for mounting the coupling to an associated frame member.

In this case the flexible body is preferably of generally curvilinear shape in transverse cross section.

In one case the flexible body is of generally hourglass shape in transverse cross section having a central narrow waist portion and a pair of wider portions on either side of the waist portion.

Preferably the casing parts are shaped to conform with the shape of the flexible body.

In this case preferably each mounting means comprises a first plate member which extends in use longitudinally of the frame member to which it is attached and a second plate member extending transversely of the frame member.

In another particularly preferred aspect of the invention the flexible body has a longitudinal axis which extends generally parallel to the longitudinal axis of the frame members.

In this case preferably the mounting means comprises a plate member at each end of the flexible body for attaching to adjacent frame members.

Preferably translation constraining means are provided to constrain translational movement of the coupling along the longitudinal axis.

In a particularly preferred embodiment of the invention the translation constraining means comprises:
 first translational limiting means to limit movement of the flexible body in tension a predetermined amount; and
 second translational limiting means to limit movement of the flexible body in compression a predetermined amount.

Typically, the first translation limiting means comprises a non-flexible member extending through the flexible body, the effective length of the non-flexible member being set to permit only a predetermined translational movement of the flexible body, additional tension force applied to the flexible body above a preset amount being taken up by the non-flexible member.

Preferably the non-flexible member comprises an elongate rod having stop means to set the predetermined translational movement of the flexible body under tension.

Advantageously the stop means is adjustable to set the predetermined translational movement of the flexible body under tension.

In one case the non-flexible member comprises a chain.

Preferably the second translational limiting means comprises a pair of rigid stop members within the flexible body, the stop members being spaced-apart to define therebetween a gap corresponding to a predetermined allowed translation movement of the flexible body in compression, additional compression force above a preset amount being taken up by the stop members.

Preferably the flexible body is an elongate body having a central elongate core.

In one embodiment of the invention the flexible body in longitudinal cross section comprises a central enlarged portion and a pair of side narrower portions flanking the central portion.

The invention also provides a framework for a fish breeding enclosure incorporating a coupling according to the invention between the frame members of the framework. Preferably there are at least two spaced-apart couplings between adjacent frame members of the framework.

The invention also provides a fish breeding enclosure having a framework incorporating couplings according to the invention.

BRIEF DESCRIPTION OF THE DRAWINGS

The invention will be more clearly understood from the following description thereof given by way of example only with reference to the accompanying drawings in which.

DESCRIPTION OF PREFERRED EMBODIMENTS

Figure 5:
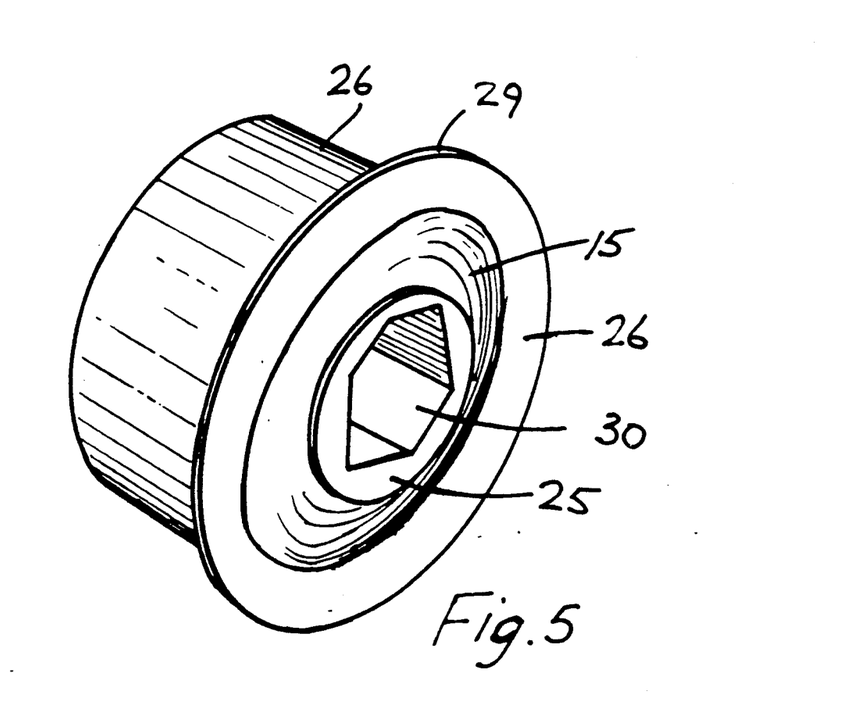
FIG. 5 is a perspective view from the other side of the coupling part.
Figure 6:
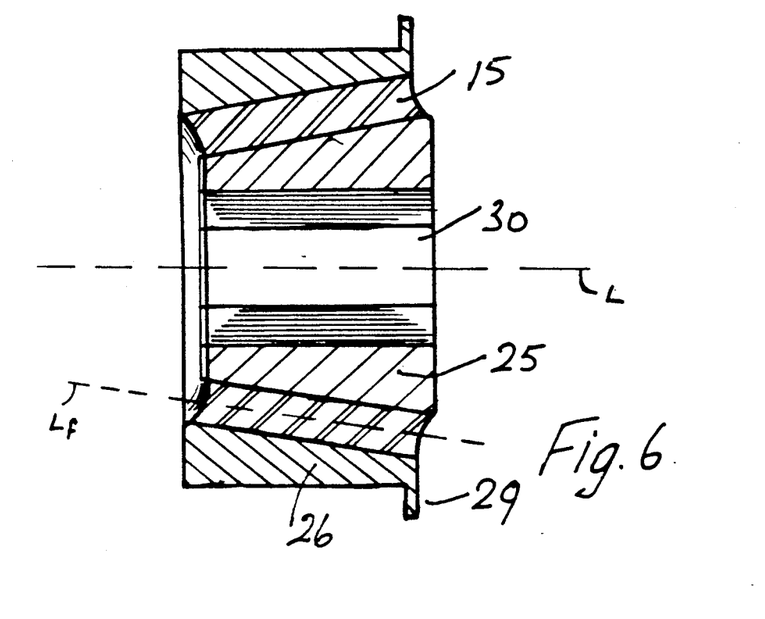
FIG. 6 is a cross sectional view of the coupling part of FIGS. 4 and 5.
Figure 7:
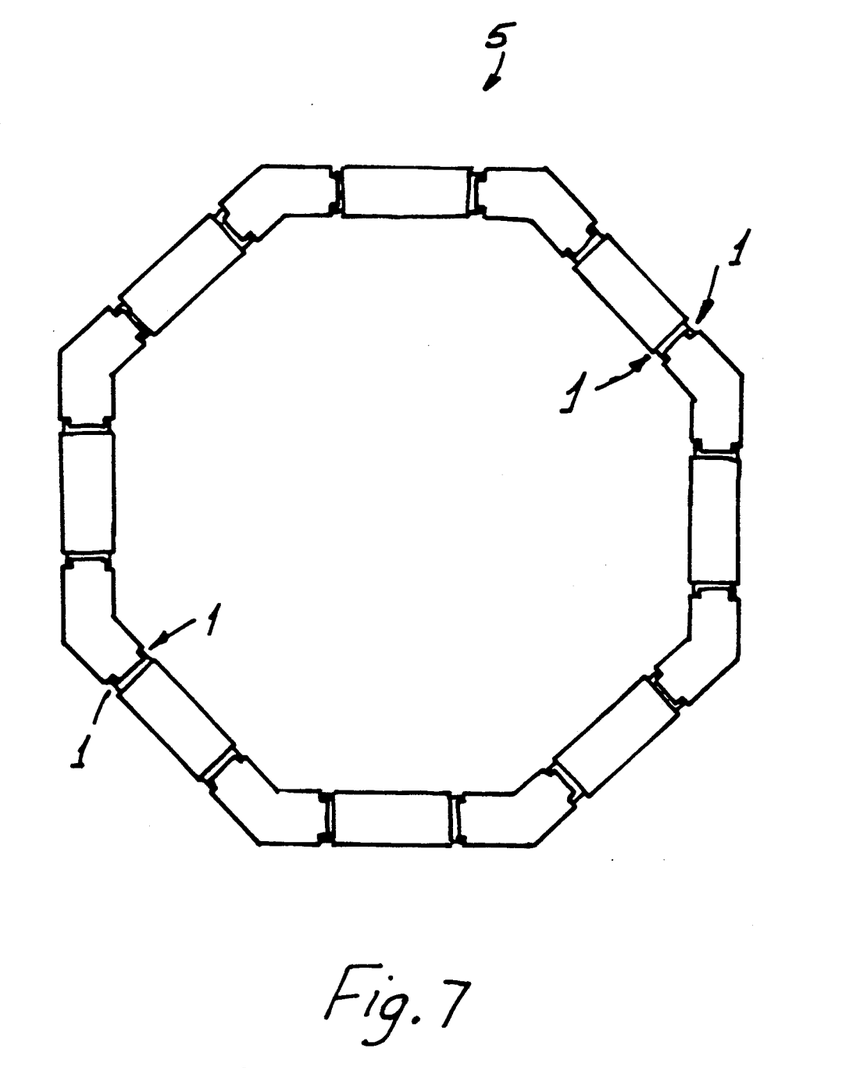
FIG. 7 is a plan view of a typical layout of a fish breeding enclosure incorporating the couplings of the invention.
Figure 8:
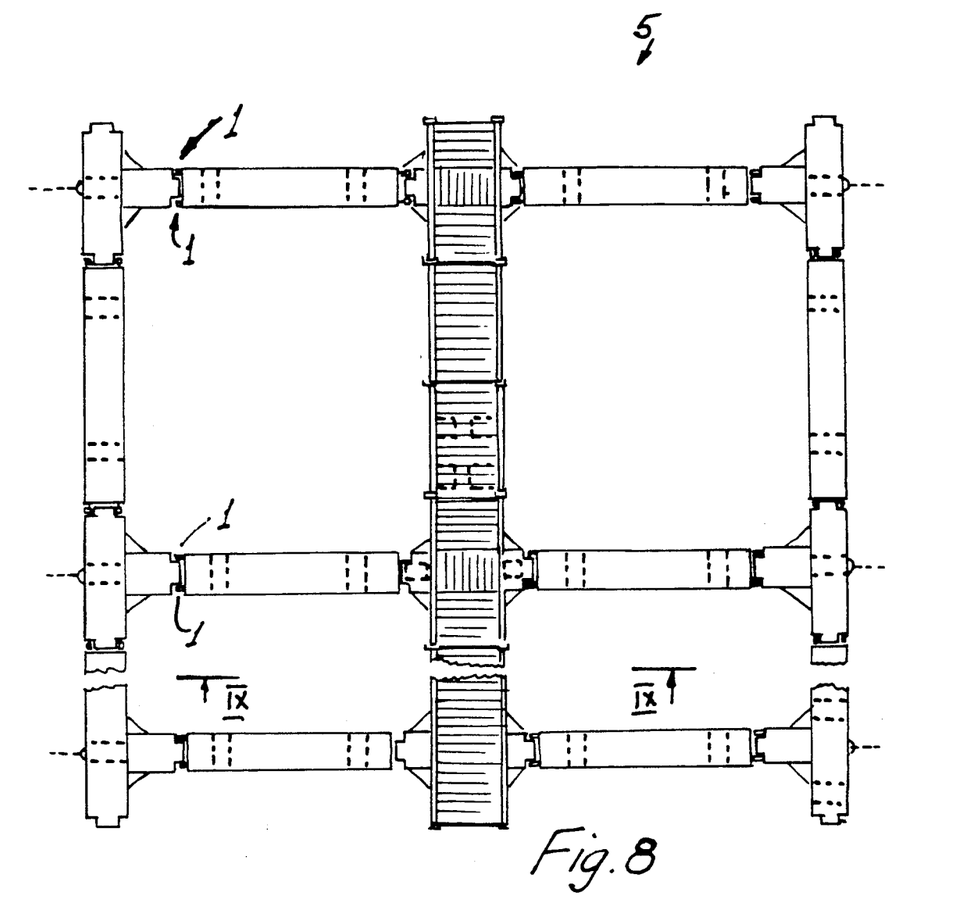
FIG. 8 is a plan view of a layout of another fish breeding enclosure incorporating couplings according to the invention.
Figure 9:
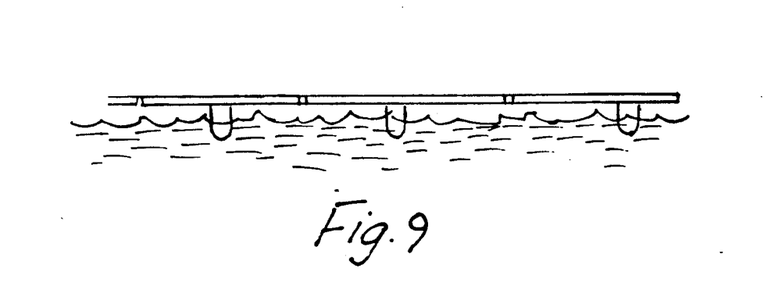
FIG. 9 is a view on line IX—IX in FIG. 8.

Referring to the drawings and initially to FIGS. 1 to 9 thereof there is illustrated a coupling according to one embodiment of the invention and indicated generally by the reference numeral 1. The coupling 1 is used for joining adjacent frame members 2, 3 of a fish breeding enclosure 5. It will be noted that in this case a central longitudinal axis L of the coupling 1 is arranged substantially transversely of the adjacent frame members 2, 3 to which it is attached. Some typical layouts of fish breeding enclosures incorporating the couplings 1 according to the invention are illustrated in FIGS. 7 to 9.

Referring in particular to FIGS. 1 to 6 the coupling 1 in general terms comprises a first mounting means 10 for mounting to one frame member 2 and a second mounting means 11 for mounting to another adjacent frame member 3. A flexible body of elastomeric material is provided between the first and second mounting means 10, 11 and the arrangement is such that the coupling 1 allows controlled relative rotational and translational movement between the frame members 2, 3 in use to a predetermined level. As will be described in more detail below the means for constraining the relative rotational and translational movement between the frame members 2, 3 is in some cases provided by the properties of the elastomeric material of the flexible body and in other cases by mechanical stops.

Figure 1:
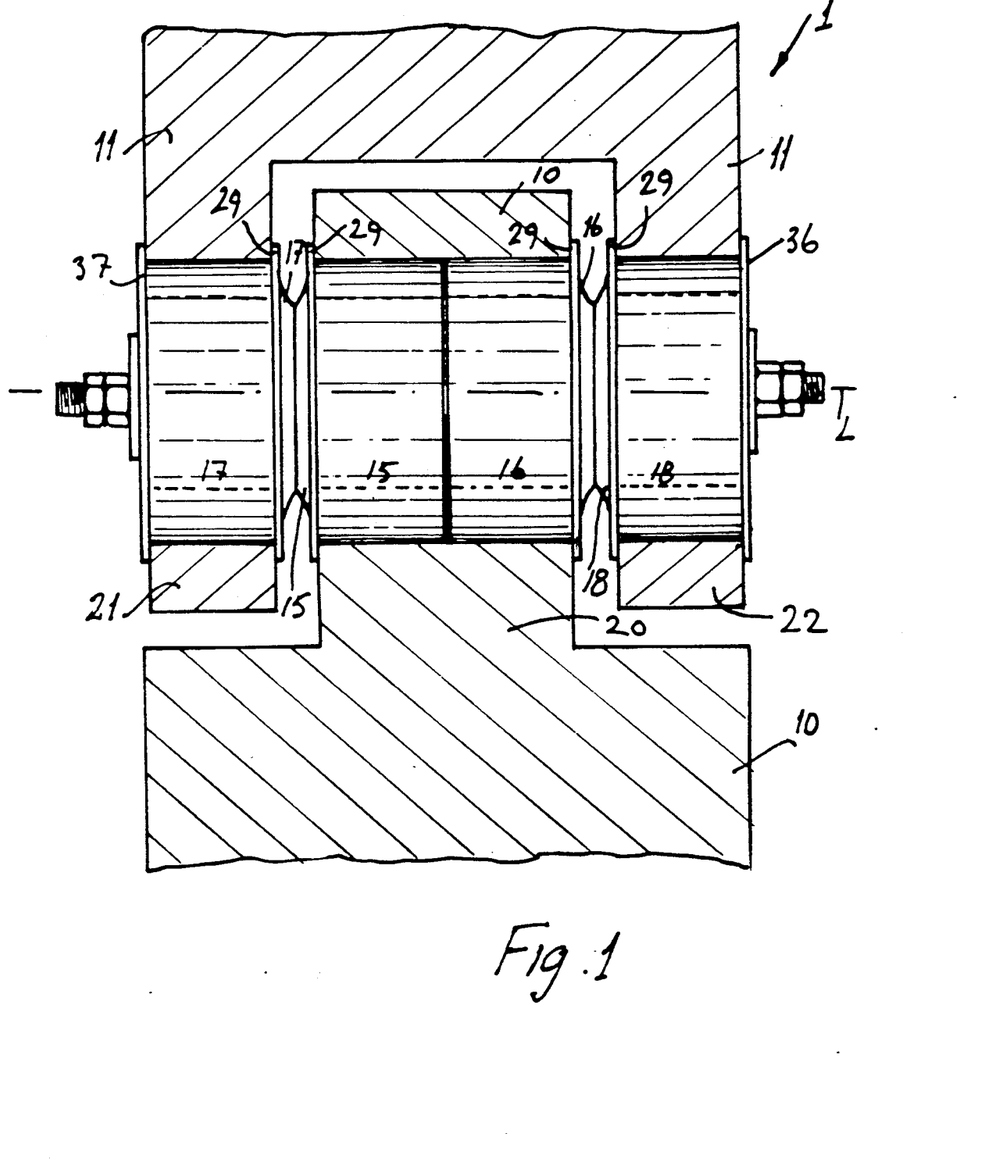
FIG. 1 is a plan, partially cross sectional view of a coupling according to one embodiment of the invention.
Figure 2:
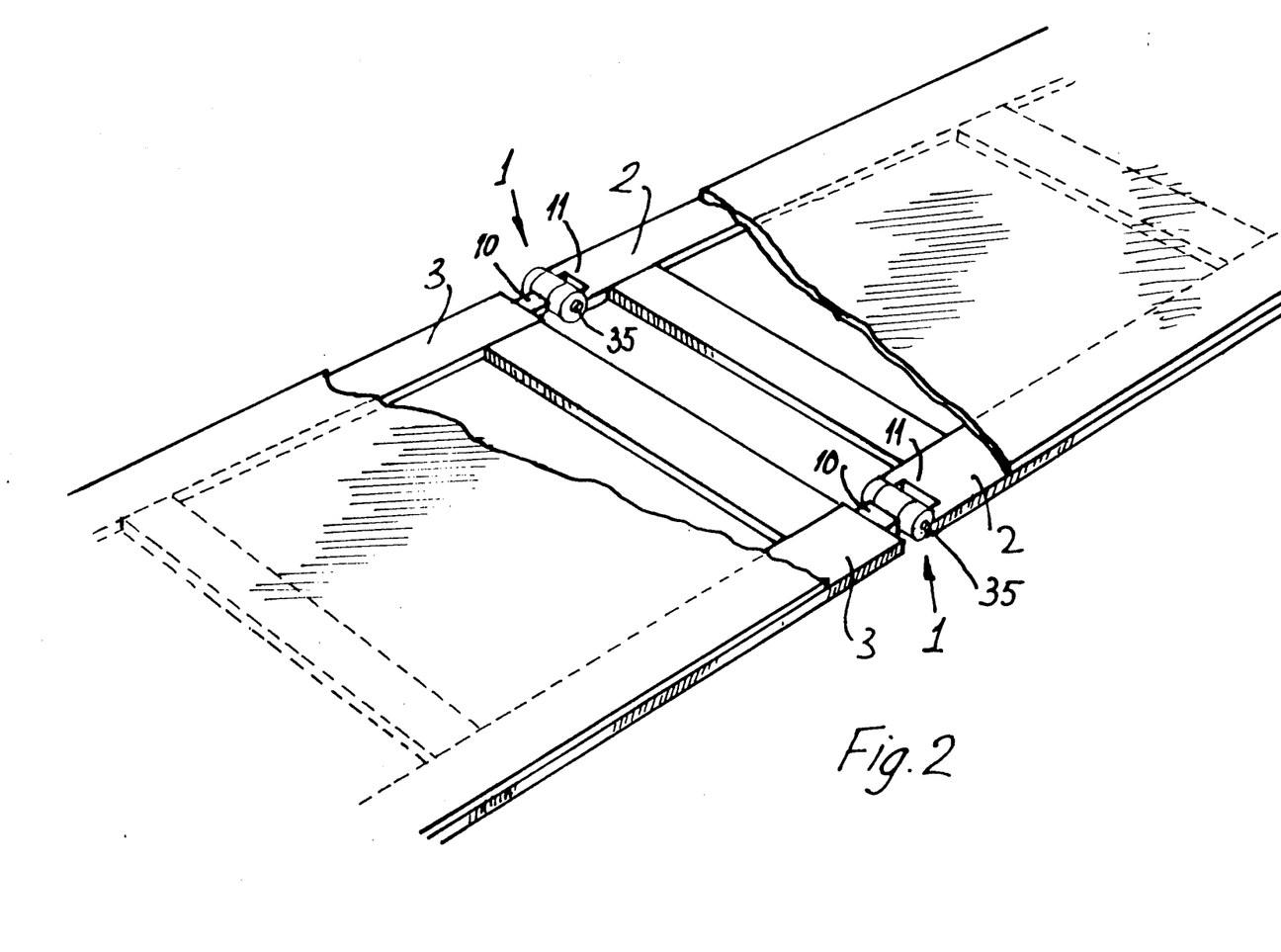
FIG. 2 is a perspective view of the coupling of FIG. 1, in use.

The flexible body is divided into at least two flexible body parts, in this case two pairs of flexible body parts, namely a central pair of flexible body parts 15, 16 associated with the first mounting means 10 and an outer pair of flexible body parts 17, 18 flanking the central pair of flexible body parts 15, 16 and being associated with the second mounting means 11. The central body parts 15, 16 are confined within a first outer casing part 20 which forms the first mounting means 10 or to which the first mounting means 10 is rigidly secured. The outer flexible body parts 17, 18 are confined within second outer casing parts 21, 22 respectively which form the second mounting means 11 or to which the second mounting means 11 is rigidly secured.

Figure 4:
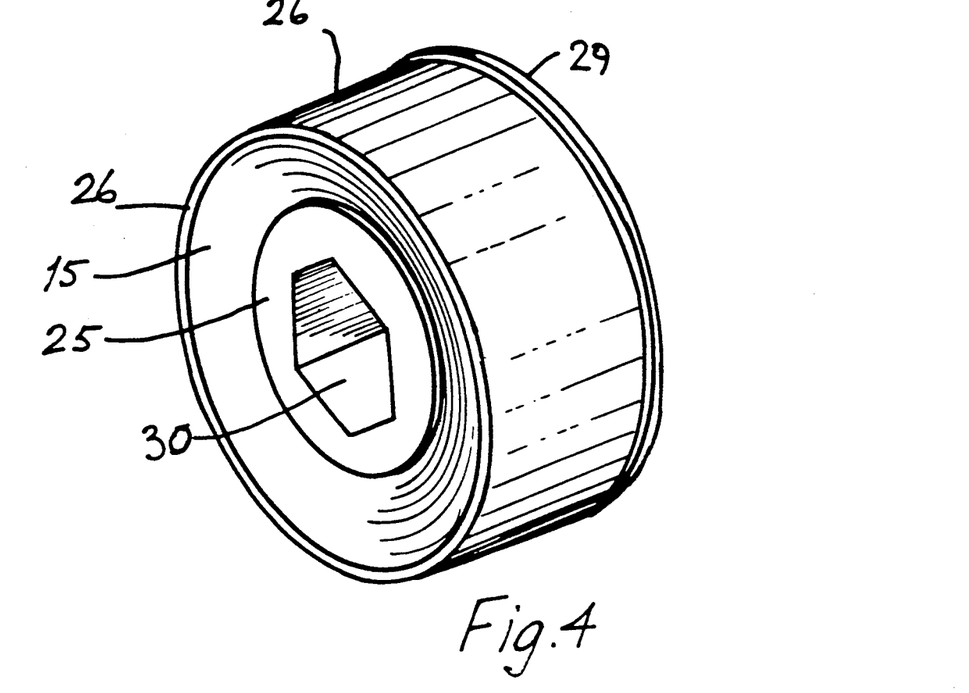
FIG. 4 is a perspective view from one side of one part of the coupling.

In this case and referring particularly to FIGS. 4 to 6 each flexible body part, for example, the flexible body part 15 is confined within a housing which comprises an inner housing part 25 and an outer housing part 26 which are radially spaced-apart to confine the annular flexible body part 15 therebetween. The outer housing part 26 is a force fit in the associated outer casing part 20, 21 or 22 and includes a radially outwardly extending flange 29 which, in use, locates and limits the entry of the outer housing part 26 into an associated casing part 20, 21.

Each inner housing part 25 has a central longitudinally extending axial bore 30 which is preferably of polygonal shape, in this case, hexagonal shape, the bores 30 of each of the four inner housing parts 25 being arranged co-axially as illustrated in FIG. 1 to form a central longitudinally extending hexagonal bore through the coupling 1. Connection means are provided between the flexible body parts to constrain translational movement between the body parts in use and in this case the connecting means comprises an elongate rod 35 of complementary hexagonal shape to that of the bore, the rod having radially outwardly extending washers or flanges 36, 37 which extend in use to engage the vertical side edges of the second outer casing parts 21, 22 as will be apparent from FIG. 1. The rod 35 may be screw threaded or in this case includes screw threaded extension portions 38, 39 on which the washers 36, 37 are mounted and fixed in position by lock nuts 40. The effect of the rod 35 is to distribute load forces applied between the flexible body parts 15, 16, 17, 18.

It will be noted that each inner housing part 25 extends axially beyond at least one end of the outer housing part 26 to permit relative translational movement between the flexible body parts in shear and compression along the longitudinal axis, the ends of the outer housing parts 26 providing limit stops to limit the movement of the flexible body parts in compression. It will also be noted that the inner housing part 25 is recessed with respect to the outer housing part 26 at the non-flanged end thereof to accommodate translational movement of the flexible annular body part 15. It will also be noted from FIG. 6 that the annular body part 15 is of conical shape with an angle of taper $L_F$ inclined with respect to the longitudinal axis L of the coupling and the angles of taper of adjacent flexible body parts are inclined with respect to each other (see FIG. 1) for accommodating loads applied to the flexible body parts, in use.

Figure 3:
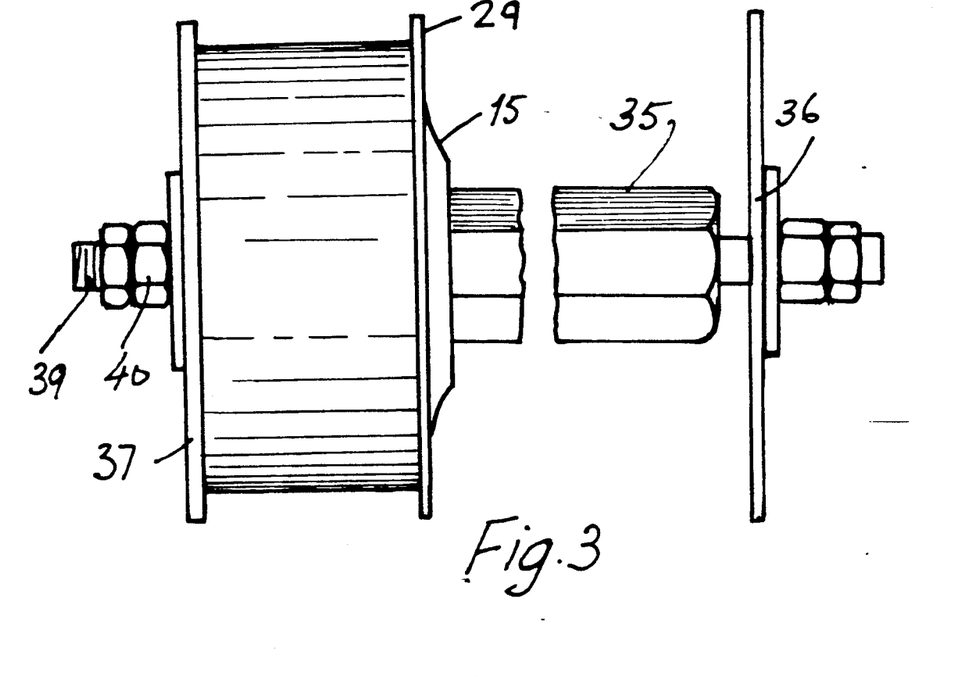
FIG. 3 is a side elevational view of part of the coupling.

For ease of manufacture, assembly and maintenance, there are, it will be appreciated, in the configuration just described, four identical parts illustrated in FIGS. 4, 5 and 6 which are assembled as illustrated in FIG. 1 and 3 into the central casing part 20 and the side casing parts 21, 22 so that the flanges 29 are facing each other. The hexagonal rod 35 is then inserted through the bores 30, the washers 36, 37 fitted and fixed in position by the lock nuts 40. The first and second mounting means 10, 11 are then attached to the frame members 2, 3 which are arranged to form a fish breeding enclosure 5 of any desired shape and configuration such as the configurations illustrated in FIGS. 7, 8 and 9. Generally there will be two couplings provided at the joint between adjacent frame members. It will be appreciated that the shape and configuration of the mounting arrangement, for example, through a flange and bolting arrangement or any suitable means is selected to achieve any desired configuration of enclosure. The couplings facilitate mounting in many different orientations as desired.

In use, the fish breeding enclosure incorporating the couplings 1 is mounted in a waterway and bending, tensile and shear forces developed in use are accommodated by the coupling without excessive wear or damage to the frame members and/or the couplings. Thus, the enclosures formed using the couplings of the invention can take up the forces developed in rough weather when sections of the enclosure will be moved a significant distance with respect to an adjacent section in response to waves and water currents generally. The arrangement in this case is such that relative rotational and translational movement between the frame members 2, 3 of the enclosure in use are constrained by the configuration, by mechanical stop means, and by the properties of the elastomeric material forming the flexible coupling parts to predetermined levels. Compression forces along the longitudinal axis L of the coupling is taken up by the stability of the flexible body parts 15, 16, 17, 18 until adjacent flanges 29 abut, the flanges 29 effectively forming limit stops to limit the translational movement. Tension or extension forces along the axis L are taken up by the flexible body parts and are limited by the flanges 29 of the outer housing 26. The polygonal shape of the rod 35 and the bores in the inner housing parts 25 through which the rod 35 extends has the effect of distributing forces applied to the flange members through the first and second mounting means 10, 11 to each of the flexible bodies.

The general advantages of the couplings according to the various embodiments of the invention are outlined in detail below. Some particular advantages of this embodiment are that because the flexible body is divided it has the effect of allowing a thinner section of flexible body to be used.

Preferably the material of the outer housing is non-metallic, most preferably of a non-metallic material which expands in sea water, such as nylon. The flexible body may be relatively easily bonded to such material and the housing can be made to achieve a good interference fit which improves in use by expansion in the sea water.

The advantage of arranging the flexible body on an axis Lf which is inclined with respect to the longitudinal axis L is in providing improved axial stiffness in use. Thus, for a given load a shorter distance between the facing flanges 29 may be provided. A low friction material such as polytetrafluoroethylene (PTFE) may be bonded to the faces of the flanges 29 to limit frictional engagement.

If a force is applied to the mounting part 10 which tends to rotate it about the axis L, the force is spread between the parts and constrained by the stiffness of the flexible body parts.

It will be appreciated that the rod 35 may have a limit stop welded thereto and may be assembled using any suitable arrangement such as by insertion through a washer which is fixed in place by a pin inserted through the rod.

Figure 10:
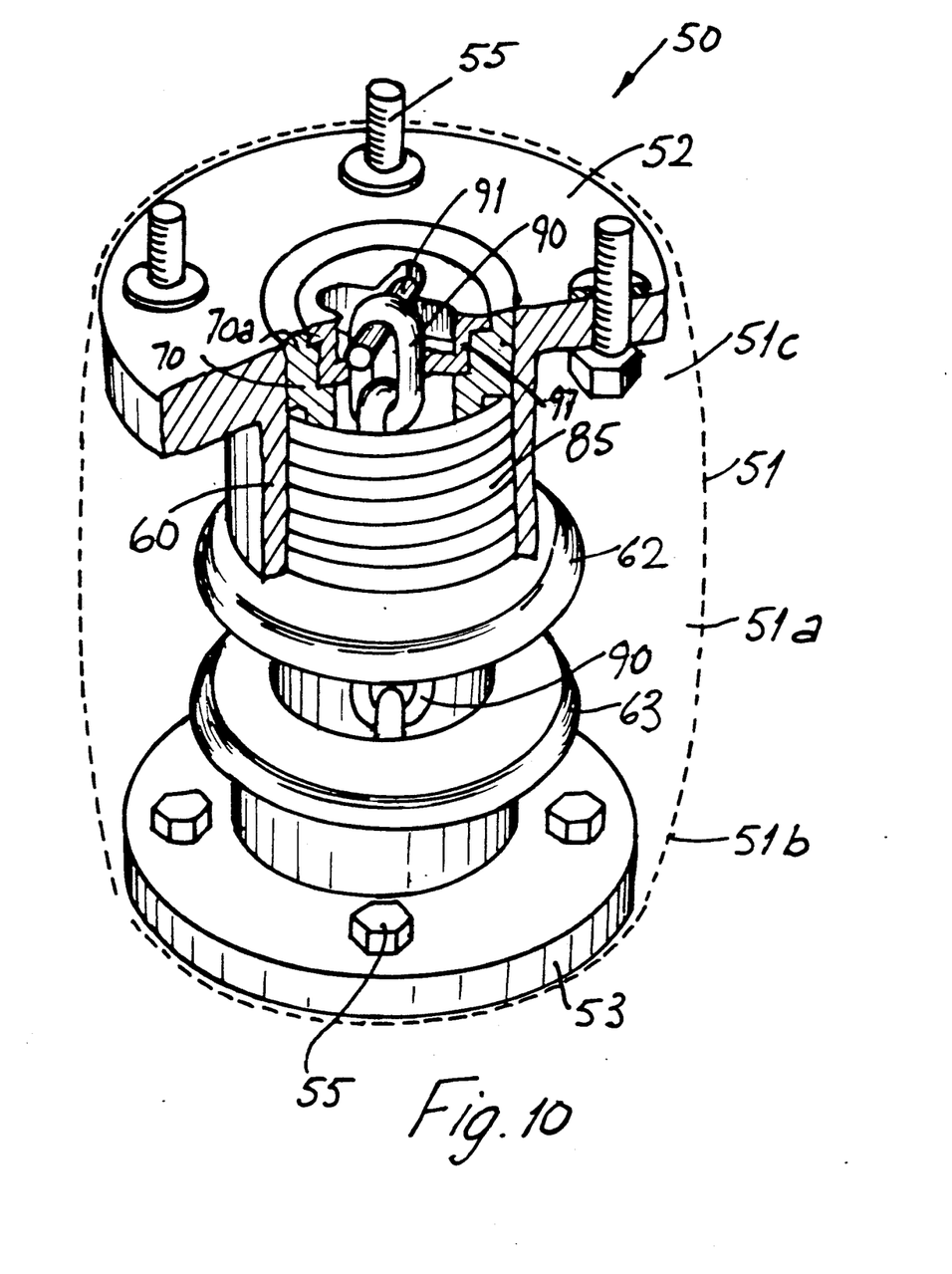
FIG. 10 is a perspective partially cut-away view of a coupling according to another embodiment of the invention.
Figure 11:
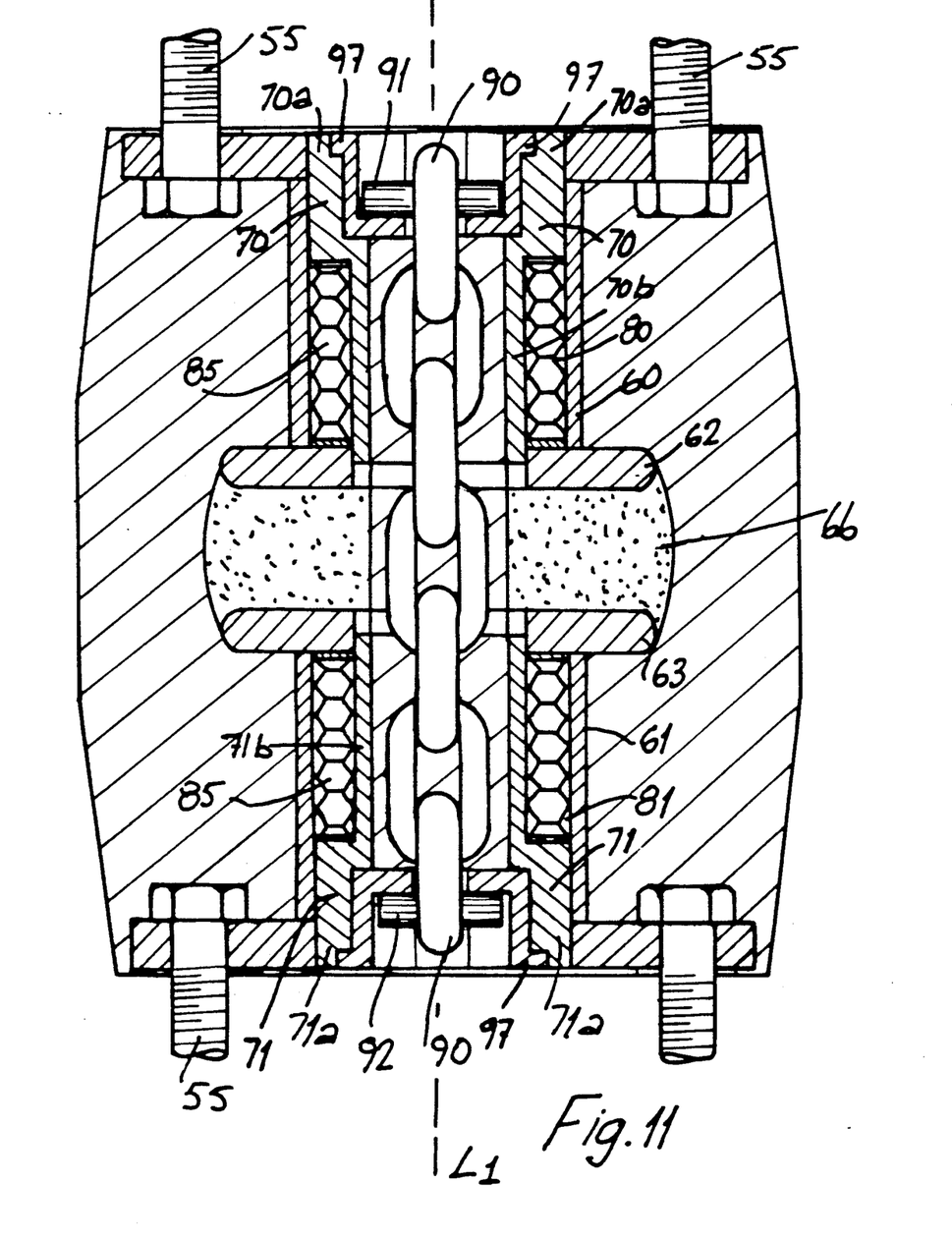
FIG. 11 is a longitudinal cross sectional view of the coupling of FIG. 10.
Figures 12, 13:
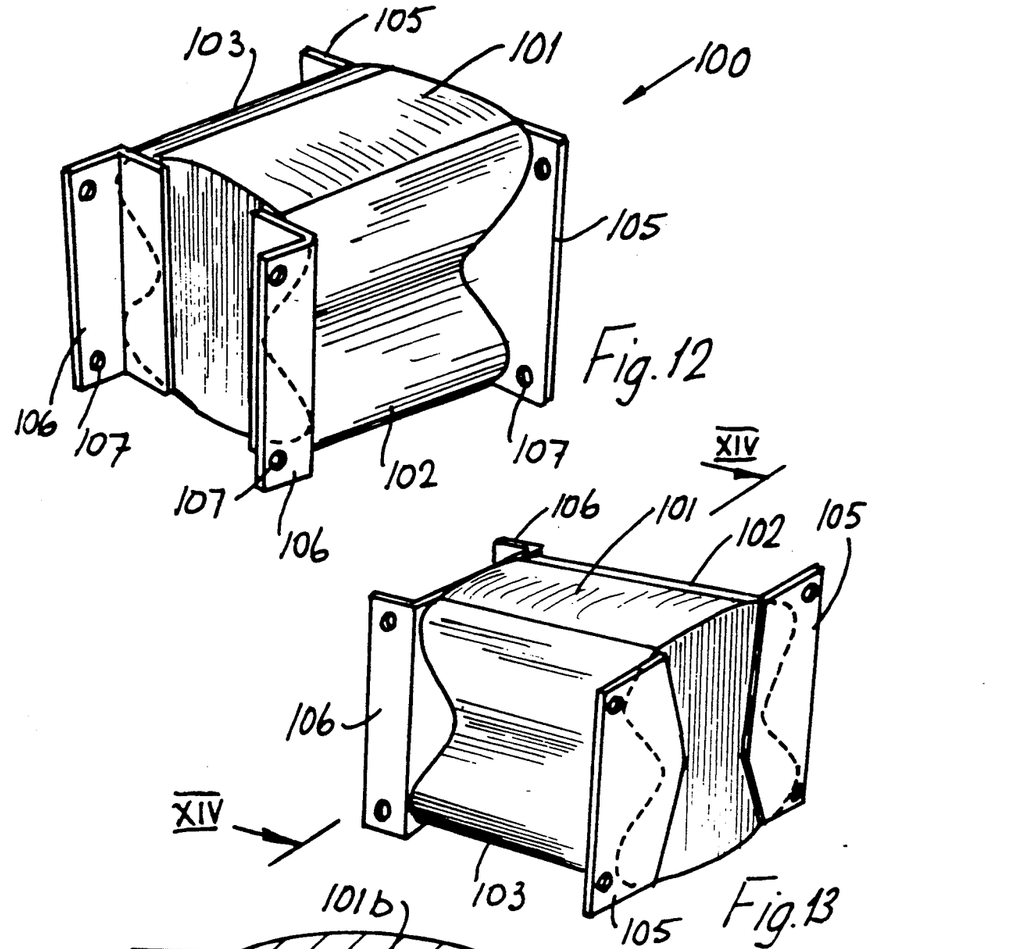
FIG. 12 is a perspective view of another coupling according to the invention.
FIG. 13 is another perspective view of the coupling of FIG. 12 from a different direction.
Figure 14:
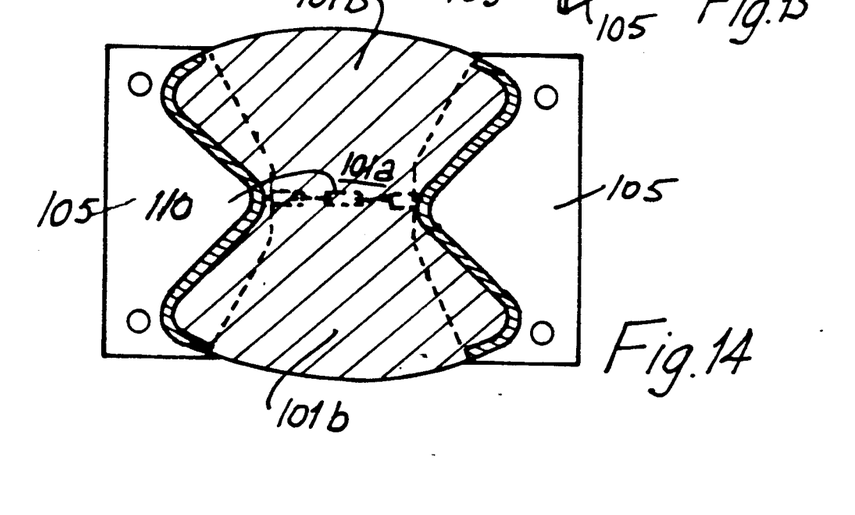
FIG. 14 is a cross sectional view of the coupling along the line XIV—XIV in FIG. 13.

Referring to FIGS. 10 and 11 there is illustrated another coupling 50 according to the invention which in general terms is similar to the coupling described above with reference to FIGS. 1 to 9 and is used in a similar manner. In this case the longitudinal axis L1 of the coupling 50 is in use arranged parallel to the longitudinal axis of the frame members to which it is attached.

The coupling 50 comprises a flexible body 51 of a suitable flexible elastomer material such as polyurethane, which is moulded around and bonded to a pair of end flanges 52, 53 which form a first and second mounting means respectively for mounting to adjacent frame members of the fish breeding enclosure framework. The end flanges 52, 53 carry bolts 55 for mounting to elements of a fish breeding enclosure to form any suitable arrangement such as the arrangement illustrated in FIGS. 7 to 9. In this case the flexible body 51 is of generally barrel-shape having a central wide portion 51A and a pair of side portions 51B, 51C flanking the wide portion 51A.

Outer tubular elements 60, 61 are welded to and extend inwardly of the end flanges 52, 53 respectively. The inner ends of the tubular elements 60, 61 are in turn welded to smaller diameter inner flanges 62, 63 which are spaced-apart to define therebetween a central core which may be hollow, or as in the case illustrated, may be filled with a lightweight and flexible foam material 66 such as a polyurethane foam which prevents the elastomer filling the core.

Inner tubular elements 70, 71 of axially stepped configuration are disposed within the outer tubular elements 60, 61. The inner tubular elements 70, 71 are not fixed to any other element of the coupling. Each of the inner tubular elements 70, 71 includes a thick outer portion 70A, 71A and a thinner inner portion 70B, 71B. The thinner inner portions 70B, 71B are spaced-apart from the outer tubular elements 60, 61 to define annular spaces 80, 81 respectively to accommodate a plurality of spring members 85 which in this case are of hexagonal shape in transverse cross section. The spring members 85 which are preferably of an elastomeric material may be of any desired shape such as of circular shape in transverse cross section. It will be noted that each of the outermost and innermost spring members 85 are shaped with flat ends to form seals to prevent elastomer material passing into the space in which the spring members 85 are housed during moulding.

A chain 90 extends centrally through the inner tubular elements 60, 61 and is attached to loadpins 91, 92 at either end which extend through the outermost links of the chain 90. The load pins 91, 92 are housed in slots 96 in a housing 97.

The outer flanges 52, 53, the bolts 55, the load pins 91, 92, the chain 90 and all other spaces except for the space housing the spring members 85 and the central core space is then encapsulated in a suitable polyurethane based elastomer material.

The surfaces of the metal components of the coupling are preferably roughened to assist in keying engagement and may alternatively or additionally be c with an adhesive compound, if desired. Other chemical bonding techniques may also be used.

In use, the couplings 50 are mounted to take up load forces applied by waves and water currents generally in the water course in which the fish breeding enclosure is mounted. The flexible coupling member 50 absorbs tension, compression, shear and turning forces. The flexibility of the flexible body 51 and the hollow central core allows the flexible body 51 to take up different configurations to accommodate the forces. To ensure that the flexible body 51 does not break in use, the maximum force which may be applied may be limited, for example, by using the chain 90. Alternatively or additionally a steel cable or elongate rod may extend through the flexible body with stops at either end for a similar purpose.

In use, the chain 90 provides a limit stop which limits the allowed translational motion of the flanges 52, 53 and hence the frame members 2, 3. Once the extension of the flexible body 51 is beyond a preset limit, the frame members 2, 3 are directly connected through the flanges 52, 52 and the chain 90. Translational compression movement along the longitudinal axis L1 of the coupling 50 is limited by the inner flanges 62, 63 which engage when the flexible body is compressed beyond a preset limit defined by the spacing between the flanges in the normal at rest position illustrated in FIG. 11. In tension, the spring members 85 are compressed to fill the void 81 which then provides a direct connection between the flanges 62, 63 through the chain 90. The spring members 85 also have the effect of damping the load applied to the chain. The ratio of the volume of the void 81 to the seals 85 sets the level at which load is taken up by the chain 90.

The particular advantages of this embodiment of the invention are that because the flanges are simple plate members they may be readily mounted to frame members. The encapsulation of the various parts in the flexible elastomeric material protects the various parts against corrosion. Because of the, flanges 62, 63, the spring members 85 and other aspects of the coupling, the response of the coupling in use may be readily designed, for example by changing the width of the gap between the flanges 62, 63.

Figure 15:
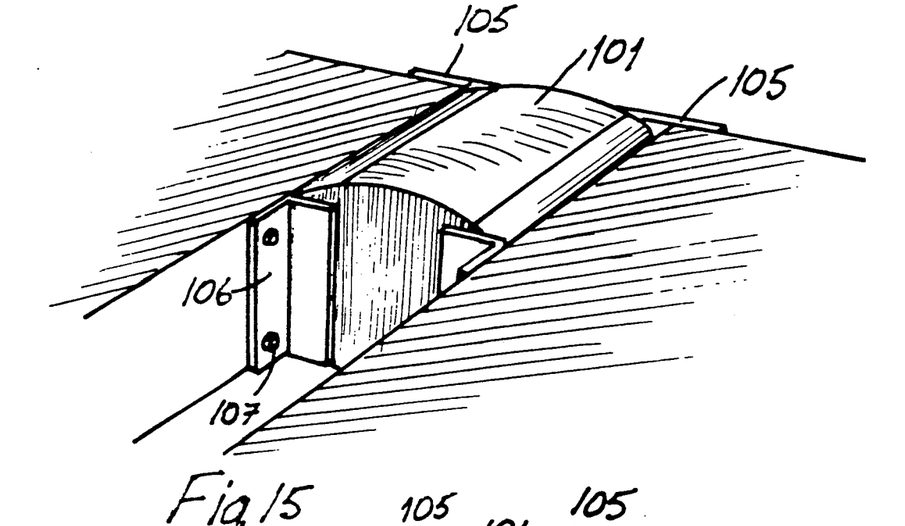
FIG. 15 is a diagrammatic perspective view illustrating the coupling of FIGS. 12 and 14, in use.
Figure 16:
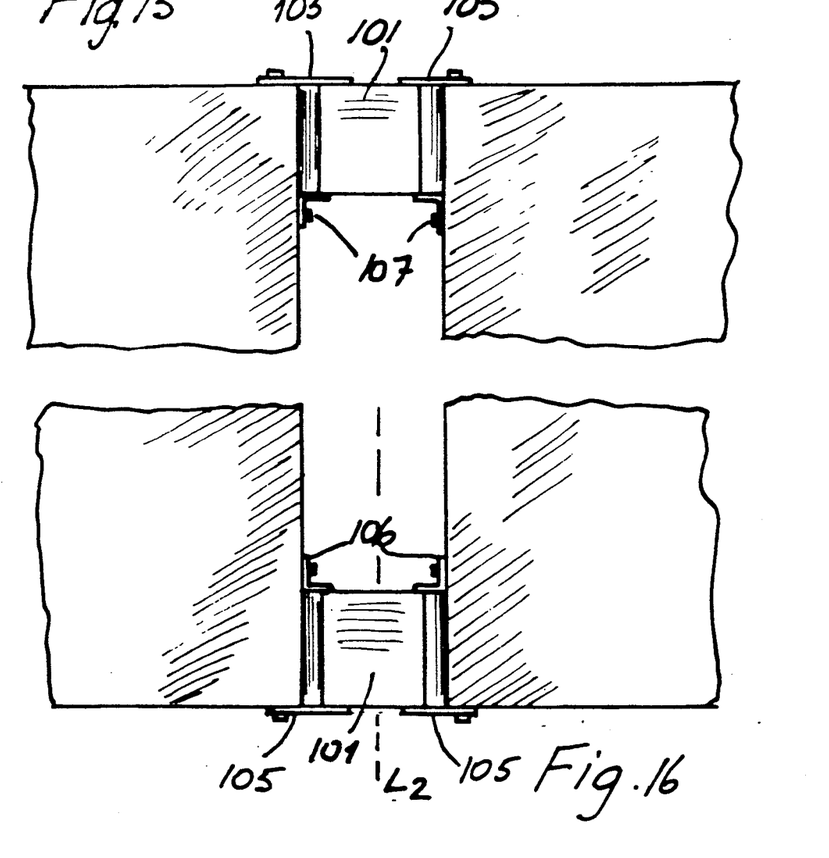
FIG. 16 is a diagrammatic plan view illustrating couplings of FIGS. 12 to 14, in use.

Referring to FIGS. 12 to 16 there is illustrated another coupling according to the invention indicated generally by the reference numeral 100. The coupling 100 is similar to the coupling 1 described above with reference to FIGS. 1 to 9, the longitudinal axis L2 of the coupling in use being arranged substantially transversely of the frame members 2, 3 to which it is attached as illustrated in FIGS. 15 and 16. The coupling 100 comprises a flexible body 101 of a suitable elastomeric material which in this case is of generally curvilinear, in this case generally hourglass shape, in transverse cross section having a central narrow waist portion 101A and a pair of wider portions 101B on either side of the waist portion 101A. The flexible body 101 is confined by an outer casing comprising two longitudinally extending outer casing parts 102, 103 attached to the flexible body 101 and carrying the mounting means for mounting the coupling 100 to the associated frame members 2, 3. The casing parts 102, 103 are shaped to conform with the shape of the flexible body as illustrated. Each mounting means for mounting the coupling to frame members comprises a first plate member 105 which extends in use longitudinally of the frame member to which it is attached and a second cranked plate member having a portion 106 which extends transversely of the frame member. The plate members 105, 106 have bolt holes 107 for bolting the coupling 1 to the associated frame members 2, 3 as will be apparent from FIGS. 15 and 16. A chain 110 extends through the flexible body 101 and is attached to the casing parts 102, 103 to limit the degree of extension of the flexible body 101 allowed along the longitudinal axis of the frame members and to provide a fail-safe mechanism interconnecting the frame members in the event of failure of the flexible body 101. The degree of compression of the flexible body 101 along the axis of the frame members is limited by the facing edges of the casing parts 102, 103 and the mounting plate members. p The particular advantages of the coupling according to this embodiment of the invention include its simplicity of construction and application. Because the flexible body is of generally curved, particularly hourglass shape there is a large surface area of mounting means to which the flexible body may be bonded. Further, by spreading out the flexible body in this way there is more active flexible material in strain so that the forces applied are distributed.

The advantages of all the embodiments of the invention are many. By flexibly connecting frame members of a fish breeding enclosure together the connections between the frame members can accommodate relatively large forces in a number of different directions. Thus, larger enclosures may be built and/or the enclosures may be sited in waterways which have heretofore not been used because of the large forces generated by water currents and waves in the waterway. The dynamic response of a fish breeding enclosure incorporating couplings according to the invention is substantially reduced. The couplings allow the geometry of the enclosure to change in both rotation and translation to accommodate water currents and waves passing through the enclosure without deformation in the frame members.

We have found that the flexible body should allow a rotational movement between the frame members of up to 30°, preferably up to 26°.

In each of the embodiments described above it will be apparent that there is no metal to metal contact which could cause wear in use. Thus, in addition to taking up forces applied by the water currents and waves in the water course in which the fish breeding enclosure is mounted, the couplings according to the invention will have a long life, in use.

It is anticipated that the couplings according to the invention will facilitate the formation of much larger enclosures than has heretofore been possible.

Many variations on the specific embodiments of the invention described will be readily apparent and accordingly the invention is not limited to the embodiments hereinbefore described which may be varied in both construction and detail.

I claim:

1. A fish breeding enclosure coupling for joining frame members of a fish breeding enclosure framework to permit controlled movement between adjacent frame members in use, said coupling comprising;
    a first mounting means for mounting to a frame member, said first mounting means having a first outer casing part comprising a central casing part associated with the one frame member;
    a second mounting means for mounting to another frame member, said second mounting means having a second outer casing part comprising a pair of side casing parts flaking said central casing part and being associated with the other frame member, said central casing part being approximately twice the width of each side casing part;
    a connecting body of flexible material between said first and second mounting means, said connecting body comprising at least two axially aligned flexible body parts;
    a housing for confining each flexible body part, each housing comprising an inner housing part and an outer housing part, each outer housing part being fitted into a respective one of the first and second outer casing parts of the first and second mounting means and including a radially outwardly extending flange for locating and limiting the entry of the outer housing part into the associated outer casing part, said inner and outer housing parts of each housing being radially spaced-apart to confine the respective flexible body part therebetween, and each inner housing part defining a bore aligned with the bores of the other inner housing parts to form a central longitudinally extending bore, there being four identical housings, one within each side casing part and two within the central casing part;
    a retaining rod extending axially through said central longitudinally extending bore, said retaining rod being shaped to prevent relative rotational movement between said inner housing parts in use; and
    washer means on said retaining rod, said washer means extending radially outwardly to engage said first and second outer casing parts in use.

2. A coupling according to claim 1 wherein each inner housing part and the associated flexible body part extend axially beyond at least one end of the respective outer housing part to permit relative translational movement between adjacent flexible body part sin shear and compression along the axis of the flexible body parts, the ends of the outer housing parts providing limit stops to limit the movement of the flexible body parts.

3. A coupling according to claim 1 wherein said inner bores defined by the inner housing parts are polygonal in transverse cross section, and said retaining rod is of complementary polygonal shape for distributing loads applied to the frame members between said flexible body parts.

4. A coupling according to claim 1 wherein each flexible body part is disposed on an axis inclined with respect to the longitudinal axis of the longitudinally extending bore.

5. A coupling according to claim 4 wherein the longitudinal axes of the material of adjacent flexible body parts are inclined with respect to each other.

6. A coupling comprising
    a first mounting means for mounting on a first frame member;
    a second mounting means for mounting on a second frame member;
    a rod of polygonal cross section passing through each of said first and second mounting means to pivotally connect said first and second mounting means on a common pivot axis;
    a plurality of coupling parts mounted on said rod in non-rotatable relation, at least one coupling part being secured in said first mounting means in non-rotatable relation and at least one coupling being secured in said second mounting means in non-rotatable relation, each of said coupling parts including an outer annular housing part mounted in a respective mounting means, an inner housing part mounted on said rod, and an elastomeric annular body part of conical shape between said outer and inner housing parts to transfer loadings therebetween, said outer annular housing part having a radial flange on one side abutting said respective mounting means.

7. A coupling according to claim 6 wherein the inner housing part of each coupling part projects from within the respective outer housing part on one side thereof while being recessed within said outer housing part on an opposite side thereof.

8. A coupling according to claim 7 wherein the inner housing part of each coupling part contacts an inner housing part of an adjacent coupling part.

9. A coupling according to claim 8 wherein the elastomeric annular body part of each coupling part is tapered, the taper of an elastomeric annular body part of one coupling unit being in a direction opposite to the taper of an elastomeric annular body part of an adjacent coupling unit.

10. A coupling according to claim 6 wherein said first mounting means has a centrally disposed casing part mounting a pair of said coupling parts therein, and said second mounting means has a pair of casing parts receiving said casing part of said first mounting means therebetween, each casing part of said second mounting means having one of said coupling parts therein.

11. A coupling according to claim 10 which further comprises a pair of washers on said rod, each washer being disposed at a respective end of said rod in abutment with said second mounting means, and a pair of nuts, each nut being threaded on said rod against a respective washer.

* * * * *